March 21, 1939.  T. B. FUNK  2,151,659
POWER LAWN MOWER
Filed Feb. 23, 1938  2 Sheets-Sheet 1

Inventor
TRUMAN B. FUNK
By Beaman & Langford
Attorney

Patented Mar. 21, 1939

2,151,659

UNITED STATES PATENT OFFICE 2,151,659

POWER LAWN MOWER

Truman B. Funk, Jackson, Mich., assignor to "Yard-Man", Inc., Jackson, Mich., a corporation of Michigan Application February 23, 1938, Serial No. 191,913

8 Claims. (Cl. 56—26)

The present invention relates to lawn mower construction, having particular reference to manually guided, power propelled lawn mowers.

It has been the practice for some time to associate a suitable prime mover with a more or less standard type of manually propelled lawn mower to convert the same into a manually guided lawn mower having power driven cutting reel and ground wheels. A consideration of this type of construction on the market today and as depicted by the patented art will show the same to be of complicated and cumbersome construction for the most part, in addition to being costly and difficult to operate.

It is the primary object of the present invention to motorize a lawn mower by resorting to very few changes in construction over what may be broadly referred to as present day conventional design of hand propelled mowers and at the same time simplify the operation of the motorized mower so that it can be handled and operated in a manner substantially identical to the manually propelled mower, with the exception that the operator has merely to guide the mower in its operation without any necessity of exerting forward pressure against the handle.

Another object is to provide a motorized lawn mower in which the ground wheels are clutched and declutched from the prime mover by bodily relative shifting movement between the ground wheel structure and the prime mover supporting structure.

Another object resides in providing a motorized lawn mower in which clutching and declutching the ground wheels from the prime mover can be accomplished in a novel manner through manipulation of the handle bar of the mower.

A further object is to provide a motorized lawn mower in which the clutching and declutching of the ground wheels to and from the prime mover is accomplished through the manipulation of the handle bar of the mower and is characterized by the fact that the handle bar is freely pivotable with reference to its supporting structure during operation of the mower.

A still further object of the invention is to provide a motorized lawn mower having the cutting reel and prime mover associated as one unitary structure and the ground wheels as another unitary structure with mechanism for accomplishing relative movement between the unitary structures for the purpose of clutching and declutching the ground wheels to and from the prime mover.

Figure 1:
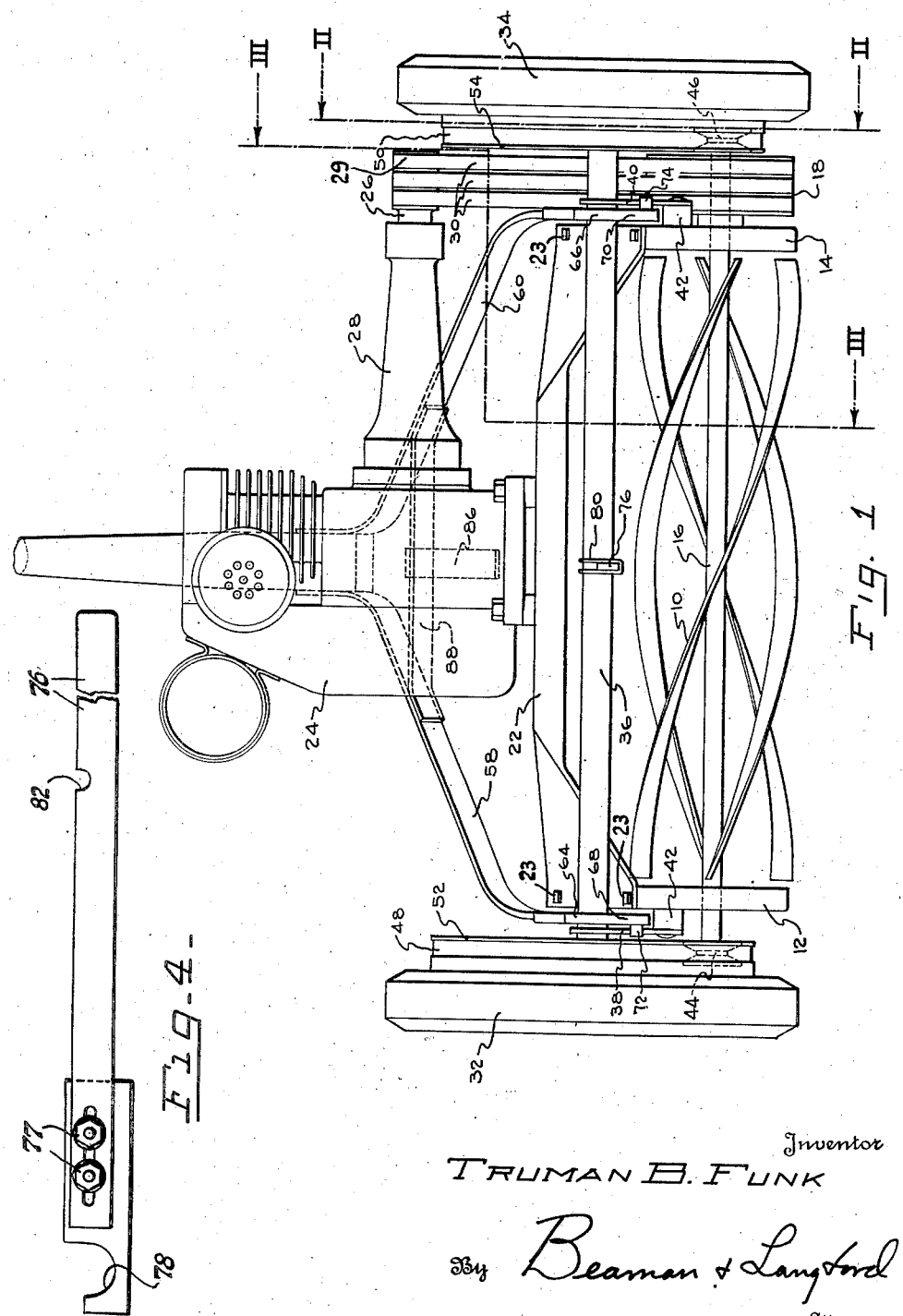
Figure 2:
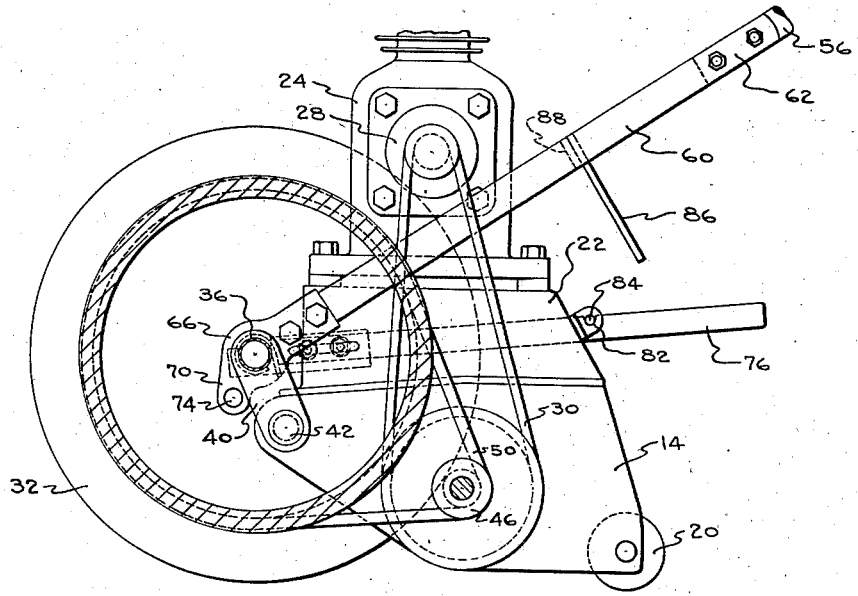
Figure 3:
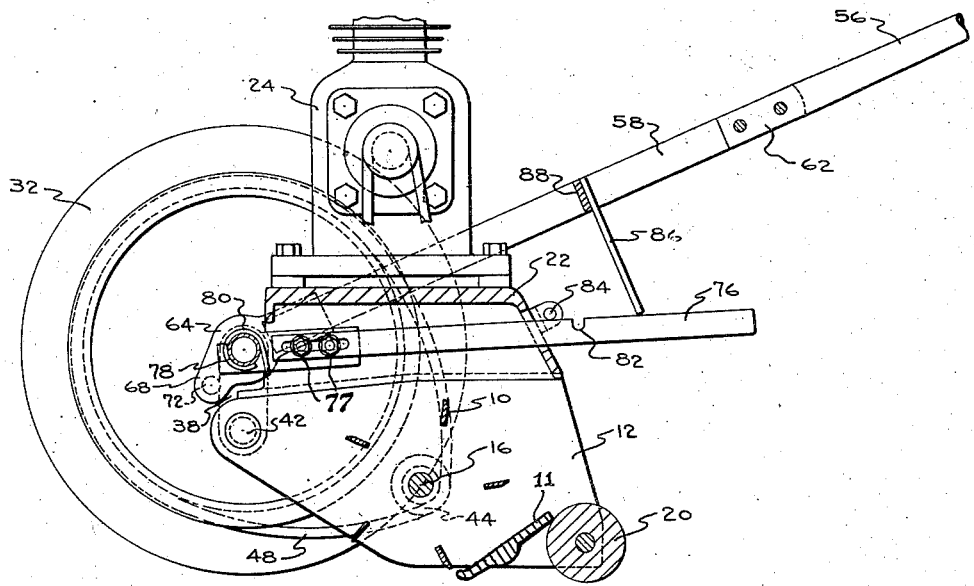

The above objects and the mechanism for accomplishing the same, together with other objects and advantages residing in the arrangement and construction and combination of parts will more clearly appear and be understood from consideration of the following detailed description and appended claims when considered in connection with the single illustrated embodiment of the invention appearing in the accompanying drawings, wherein Fig. 1 is a front elevational view of the lawn mower embodying the present invention, Fig. 2 is a cross-sectional view taken on line II—II of Fig. 1, Fig. 3 is a cross-sectional view taken on line III—III of Fig. 1, and Fig. 4 shows the latch mechanism removed from the mower.

In the form of the invention illustrated, my improved motorized lawn mower comprises a suitable rotatable cutting reel 10, or other equivalent form of cutting or shearing mechanism coacting with a cutter bar 11 and supported for rotation in end plates 12 and 14, the shaft 16 of the reel 10 extending through the plate 14 and carrying a suitable pulley 18. Also supported between the end plates 12 and 14 is a ground roller 20 of any suitable construction. It is to be understood that the specific construction of the end plates, cutting reel and ground roller may take numerous forms and shapes and may be substantially identical to any one of the numerous constructions now on the market. Spacing the end plates 12 and 14 and bridging the cutting reel 10 is a plate 22, which may be suitably connected to the end plates in any well-known manner such as through the employment of bolts 23. Supported upon the plate 22 is shown a prime mover 24, which preferably takes the form of an internal combustion engine of adequate horsepower but may be an electric motor or any other feasible form of prime mover. As shown, the prime mover 24 has a driving shaft 26 having adequate support in the bearing housing 28 to permit the relatively extended overhang illustrated. Upon the driving shaft 26 is a suitable drive pulley 29 in alignment with the pulley 18 of the reel 10 for driving the reel 10 at a continuous, substantially constant speed through suitable belts 30. It is to be understood that the reel 10 is continuously driven at all times during the operation of the prime mover 24. In other words, the prime mover 24 and the cutting reel 10 and its associated structure are tied together in one continuous driving relation.

The propelling ground wheels 32 and 34 are rotatively supported upon opposite ends of a transverse axle 36. Pivoted upon the axle 36 are hangers 38 and 40, which have pivotal connection at their lower ends with the end plates 12 and 14 through suitable bolts or studs 42. It will be apparent that the hangers 38 and 40 support the forward portion of the cutting reel structure and end plates with reference to the ground, whereas the ground roller 20 supports the rearward portion of the end plate structure with reference to the ground. Fixed to the shaft 16 are relatively small driving pulleys 44 and 46, which drive the ground wheels 32 and 34 through belts 48 and 50 riding in sheaves 52 and 54, preferably constructed as a unitary part of the ground wheels 32 and 34.

The handle 56 may be of conventional construction, having a forked lower end in the form of members 58 and 60 secured at their upper ends to the handle proper at 62 and at their lower ends in the socket members 64 and 66 pivoted upon the axle 36. The lower ends 68 and 70 of the socket members carry pins 72 and 74, which are adapted to engage with the hangers 38 and 40 to shift the latter into the position shown in Fig. 2 upon lifting the handle 56 to an extreme upper position, the handle of Fig. 2 being shown in a normal intermediate position with the pins 72 and 74 out of contact with the hangers 38 and 40. This shifting action results in relative movement between the ground wheels 32 and 34 and the driving pulleys 44 and 46, which sufficiently tighten the driving belts 48 and 50 to clutch the prime mover 24 to the ground wheels.

The structure for holding the ground wheels and cutting reel carriage unit in the driving relation shown in Fig. 2 takes the form of a two-part lever 76 having a notch 78 embracing the axle 36 for pivotal movement and being held in position thereon and urged counter-clockwise by a spring clip 80. A notch 82 on the upper edge of the lever 76 engages with a pin 84 upon the plate 22 to lock the relatively movable units in the position shown in Fig. 2 upon raising the handle 56 to actuate the hangers 38 and 40 by the pins 72 and 74. For declutching the ground wheels 32 and 34 from the prime mover 24 a projection 86 is carried by a bracket 88 extending between the forked members 58 and 60. When the handle 56 is lowered, the projection 86 engages the lever 76, as shown in Fig. 3, resulting in the hangers 38 and 40 swinging into a vertical position due to the weight of the supported structure. As this action shortens the distance between the shaft 16 and axle 36, the belts 48 and 50 driving the ground wheels are slackened, declutching the wheels from the prime mover. In addition to the weight of the supported structure acting upon the hangers 48 and 50, the resiliency of the tensioned belts 48 and 50 acts to shift the relatively movable parts from the position shown in Fig. 2 to that shown in Fig. 3 upon depressing the lever 76.

One of the important features of the present invention is deemed to reside in the fact that the handle 56 is free to pivot freely through a substantial arc, during the guiding of the lawn mower with the ground wheel being driven, without interference with the mechanism for clutching and declutching the prime mover and ground wheels. This arrangement removes the shock and fatigue which is experienced by the operation where the handle follows the motion of the motorized chassis. Preferably, the arc through which the handle 56 must be swung in order to move and remove the notch 82 of the lever 76 into and from engagement with the pin 84 is in excess of the arc which the handle of a conventional manually pushed lawn mower would normally swing in connection with its normal use. In other words, the operation and feel of my improved motorized lawn mower is substantially that of the conventional manually pushed lawn mower, with clutching and declutching of the ground wheels from the prime mover effected by merely raising and lowering of the handle beyond the limits of the arc through which it usually swings in operation.

In the illustrated embodiment of the invention it will be noted that the lever 76 is made up of two parts which may be longitudinally shifted with reference to each other and held in fixed position by suitable nuts and bolts 77. In this way the locked relation between the ground wheels and the driving pulley for the same upon the cutting reel may be varied to assure correct tensioning of the belts 48 and 50.

The lever 76 also has the additional feature of functioning as a rigid link to remove excessive strain that would otherwise be placed upon the belts 48 and 50 at the time the cutting reel chassis, including the ground roller 20, is bodily elevated. This action takes place frequently in using the mower in order to avoid obstructions, it being accomplished by lifting up on the handle 56. Under such circumstances the lever 76, through its engagement with the pin 84, constitutes a rigid link between the traction or ground wheel chassis and the cutting reel chassis.

As shown in the preferred arrangement, the cutting reel and the prime mover are always in driving relation, the selective drive being confined to the ground wheels. Where belts are being used for transmitting power, this avoids the difficulties connected with any attempt to selectively drive both the cutting reel and the ground wheels. It is a distinct advantage to be able to drive the reel without transmitting power to the traction chassis where grass and the like is being cut around such obstructions as trees and shrubs and a dwell where only slight intermittent manual advancement of the mower is desirable. It will be understood that with the lever 76 unlatched, as shown in Fig. 3, that the mower may be manually pushed about in exactly the same manner as a conventional hand mower.

From the foregoing description it should become apparent to those skilled in the art that I have provided a motorized lawn mower in which all auxiliary controls upon the handle have been eliminated. The design of my construction is extremely simple and inexpensive to manufacture and except for the cost of the prime mover may be manufactured at a cost not greatly exceeding that of the conventional manually pushed lawn mower. Moreover, the operation of the lawn mower is not complicated, and it may be skillfully used by any operator familiar with the use of manually pushed lawn mowers.

Having thus described my invention, what I desire to secure by Letters Patent and claim is:

1. A power mower, comprising a traction chassis, a cutter chassis supporting a cutting element, a rotatable shaft, means supporting said cutter chassis from said traction chassis for shiftable movement to change the relative position of said chassis with respect to each other, a prime mover upon said cutter chassis permanently geared to said shaft, a pulley upon said shaft, a pulley upon said traction chassis, a belt transmitting power between said pulleys, a single handle for guiding said traction chassis as well as for selectively controlling the driving thereof from said prime mover, means extending between said chassis actuated by said handle supported in one of said chassis for relatively shifting said chassis to vary the distance between said pulleys, a self-actuating latch having its coacting parts carried by said chassis for locking said chassis in their outwardly shifted position tightening said belt upon said pulleys, and means associated with said handle and operated through the movement of said handle for unlocking said latch to permit shifting of said chassis to slacken said belt.

2. A power mower as set forth in claim 1, in which said latch is adjustable, whereby the tensioning of said belt may be regulated with said chassis shifted into their locked position.

3. A power lawn mower comprising a cutter chassis supporting a cutting reel having a reel shaft, a motor mounted upon said chassis and continuously driving said shaft, a pulley upon said shaft, ground wheels, means for supporting said ground wheels for bodily movement relative to said shaft, a sheave associated with and driving said ground wheels and movable therewith, said sheave being in alignment with said pulley and directly adjacent thereto, a driving belt running over said pulley and sheave, a pivotally supported handle for steering the motor over the ground, independently supported portions associated with said handle and said supporting means for said wheels with one of said portions extending between said cutter chassis and said means, said supported portions being movable into and out of engagement with each other upon pivotal movement of said handle for bodily moving said wheels and sheave relative to said shaft to tighten said belt, latch means for maintaining said wheel and sheave following bodily movement in fixed relation to the axis of said shaft, and means associated with said handle acting upon said latch upon pivotal movement of said handle to release said wheel and sheave for movement in a direction loosening said belt.

4. In a power lawn mower having a cutter chassis, ground wheels shiftable relative to the cutter chassis, and a pulley-belt driving connection between said chassis and ground wheels, the combination with a single handle for steering and controlling the driving of the ground wheels, said handle being pivotally supported at one end to the mower and capable of substantial up and down movement at its other end held by the operator, of an actuated member interposed between said chassis and ground wheels, means constituting operative connections between said member and said chassis and ground wheels, said member being moved to effect relative movement between said chassis and ground wheels to tighten the belt for selectively driving the ground wheels, a part connected to said handle and moved thereby, said part having a portion spaced from and out of operative relation with said member with said handle in the positions required for steering purposes, said portion upon predetermined movement of said handle being brought into engagement with said member to move the same, effecting relative movement between said chassis and ground wheels to tighten the belt for selectively driving the ground wheels.

5. In a power lawn mower having a body structure including cutting mechanism, traction wheels, and a prime mover, the combination with a single handle for steering the mower over the ground and for controlling the driving of the traction wheels, said handle being connected at one end of said body for pivotal movement in a vertical plane, the outer end of said handle having lower, intermediate and upper ranges of pivotal movement, with the intermediate range being provided to steer the mower over the ground, driving mechanism for the traction wheels including a shiftable member movable from one position to another for selectively clutching and declutching the traction wheels to and from the prime mover, means associated with the handle and moved thereby, said means including a portion spaced from and out of operative relation with said shiftable member, with said handle located within said intermediate range and being adapted to engage with said shiftable member when said handle is pivoted into said upper range to move the same into a position driving said traction wheels, means for holding said member in said position thereafter while said handle is operating within said intermediate range, and means associated with said handle and having a part engaging with said holding means for releasing said holding means with said handle pivoted into said lower range whereby said member is released to its initial position.

6. In a power lawn mower having a body structure, including cutting mechanism, traction wheels, and a prime mover, the combination with a handle for steering said mower over the ground and for selectively controlling the driving of the traction wheels from the prime mover, means connecting one end of said handle to said body structure for pivotal movement to enable said body structure to have movement relative to said handle, said handle having one range of movement for steering purposes over the ground and at least one other range of movement for controlling the selectable driving of the traction wheels from the prime mover, power transmitting means between said prime mover and traction wheels including a driving belt, a member movable to one position to tighten said belt and into another to loosen said belt, a lost motion connection between said member and said handle, said connection upon movement of said handle to said other range moving said member into a belt tightening position, said connections having engaging parts through which movement of said handle is imparted to said member, said parts being in spaced inoperative relation with said handle operating in said steering range.

7. A power driven lawn mower, consisting of a body structure, cutting mechanism mounted thereon, traction wheels for supporting the body structure for movement along the ground, a prime mover for driving said cutting mechanism and traction wheels, a handle pivoted at its lower end to said body structure and extending upwardly and rearwardly for manually guiding the mower over the ground, means pivotally connecting said handle to said body structure, whereby said handle has pivotal movement in one range when the same is being used for steering the body structure over the ground and being capable of pivotal movement into another range for selectively controlling the driving connection between said prime mover and said traction wheels, a belt drive extending between said prime mover and said traction wheels, belt tightening structure for selectively controlling the drive between said prime mover and said traction wheels through said belt drive, said mechanism including a shiftable member movable from one position to another to tighten and loosen said belt drive, a portion upon said handle, a portion upon said member, said portions being in spaced inoperative relation with each other with said handle pivoting within its steering range, said portion of said handle with said handle pivoted out of said steering range engaging with said portion of said member to shift said member into a belt tightening position, the engagement between said portions to shift said member being characterized by the fact that return movement of said handle into said steering range completely disconnects said handle from said member.

8. A power lawn mower, comprising a body structure, cutting mechanism supported in said body structure, traction wheels for supporting and propelling said body structure over the ground, a prime mover supported on said body structure, driving mechanism between said prime mover and traction wheels, a steering handle pivoted at its lower end to said body structure, means for rendering said driving connection operative and inoperative to selectively drive said traction wheels from said prime mover, said means being entirely disconnected from said handle and having the operating parts thereof spaced from said handle except at the time of extreme pivotal movement of said handle beyond that required for steering purposes, and a portion upon said handle engaging with said means with said handle in its extreme pivoted position for shifting said means into a position rendering said driving mechanism operative to drive said traction wheels, all parts of said handle following shifting of said means being out of influencing relation with said means upon return movement to the range required for steering purposes.

TRUMAN B. FUNK.